United States Patent
Muendel et al.

(10) Patent No.: US 9,250,390 B2
(45) Date of Patent: Feb. 2, 2016

(54) VARYING BEAM PARAMETER PRODUCT OF A LASER BEAM

(71) Applicants: Lumentum Operations LLC, Milpitas, CA (US); Amada Holdings Co., Ltd., Isehara, Kanagawa (JP)

(72) Inventors: Martin H. Muendel, Oakland, CA (US); Dahv Kliner, Mountain View, CA (US)

(73) Assignees: Lumentum Operations LLC, Milpitas, CA (US); Amada Holdings Co., Ltd., Isehara (JP)

(*) Notice: Subject to any disclaimer, the term of this patent is extended or adjusted under 35 U.S.C. 154(b) by 311 days.

(21) Appl. No.: 13/707,446

(22) Filed: Dec. 6, 2012

(65) Prior Publication Data

US 2013/0148925 A1     Jun. 13, 2013

Related U.S. Application Data

(60) Provisional application No. 61/569,012, filed on Dec. 9, 2011.

(51) Int. Cl.
| | | |
|---|---|---|
| *G02B 6/26* | (2006.01) | |
| *G02B 6/32* | (2006.01) | |
| *G02B 6/42* | (2006.01) | |

(Continued)

(52) U.S. Cl.
CPC .............. *G02B 6/32* (2013.01); *B23K 26/0626* (2013.01); *B23K 26/0648* (2013.01); *B23K 26/0734* (2013.01); *G02B 6/4296* (2013.01); *G02B 6/262* (2013.01); *G02B 6/4206* (2013.01)

(58) Field of Classification Search
CPC .... G02B 6/32; G02B 6/4296; B23K 26/0626; B23K 26/0648; B23K 26/0734
USPC ........................................................ 385/27, 33
See application file for complete search history.

(56) References Cited

U.S. PATENT DOCUMENTS

| | | | |
|---|---|---|---|
| 3,921,100 A | 11/1975 | Olinger, Jr. et al. | 372/90 |
| 4,011,403 A | 3/1977 | Epstein et al. | 348/370 |
| 4,407,561 A | 10/1983 | Wysocki | 385/128 |

(Continued)

FOREIGN PATENT DOCUMENTS

| | | | |
|---|---|---|---|
| CN | 102248286 | 11/2011 | |
| DE | 4200587 | 4/1993 | A61B 17/36 |

(Continued)

OTHER PUBLICATIONS

TRUMPF Group Business Filed Laser Technology Press/ Public Relations—Press Release—One Laser light cable—two applications—Oct. 2010.

(Continued)

*Primary Examiner* — Jerry Blevins
(74) *Attorney, Agent, or Firm* — Harrity & Harrity, LLP

(57) ABSTRACT

An optical delivery waveguide for a material laser processing system includes a small lens at an output end of the delivery waveguide, transforming laser beam divergence inside the waveguide into a spot size after the lens. By varying the input convergence angle and/or launch angle of the laser beam launched into the waveguide, the output spot size can be continuously varied, thus enabling a continuous and real-time laser spot size adjustment on the workpiece, without having to replace the delivery waveguide or a process head. A divergence of the laser beam can also be adjusted dynamically and in concert with the spot size.

42 Claims, 7 Drawing Sheets

(51) Int. Cl.
*B23K 26/06* (2014.01)
*B23K 26/073* (2006.01)

(56) References Cited

U.S. PATENT DOCUMENTS

| | | | |
|---|---|---|---|
| 4,701,011 A | 10/1987 | Emkey et al. | 385/34 |
| 4,730,885 A | 3/1988 | Doi | 385/92 |
| 4,799,755 A | 1/1989 | Jones | 385/38 |
| 5,040,867 A | 8/1991 | De Jong et al. | 385/60 |
| 5,245,682 A | 9/1993 | Ortiz, Jr. | 385/33 |
| 5,684,642 A | 11/1997 | Zumoto et al. | |
| 6,476,350 B1 | 11/2002 | Grandjean et al. | 219/121.69 |
| 6,488,414 B1 | 12/2002 | Dawes et al. | |
| 7,151,788 B2 | 12/2006 | Imakado et al. | 372/101 |
| 2004/0184287 A1 | 9/2004 | Smith et al. | 362/560 |
| 2007/0242922 A1* | 10/2007 | Tanaka | 385/33 |
| 2010/0044106 A1 | 2/2010 | Zediker et al. | 175/16 |
| 2011/0096404 A1 | 4/2011 | Kadar-Kallen | 359/653 |

FOREIGN PATENT DOCUMENTS

| | | | |
|---|---|---|---|
| EP | 0366856 | 5/1990 | A61B 17/00 |
| WO | 2011/124671 | 10/2011 | G02B 6/28 |

OTHER PUBLICATIONS

PCT Search Report for PCT/US2012/068295, Jan. 30, 2013.
European Search Report corresponding to EP 12855735 mailed Sep. 21, 2015, 12 pages.

* cited by examiner

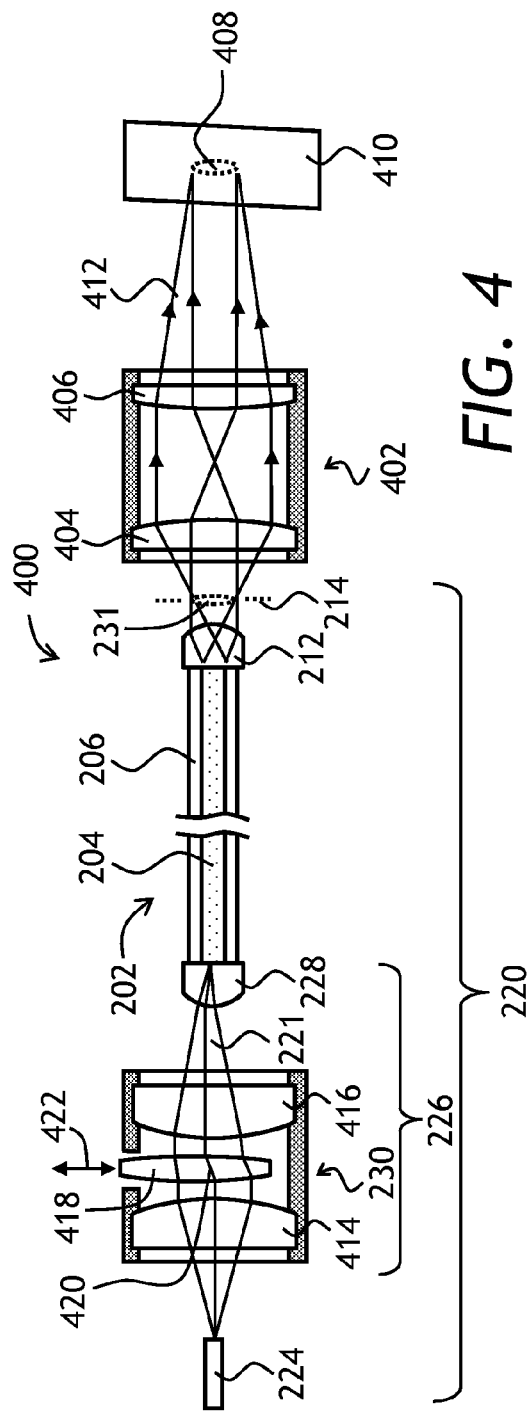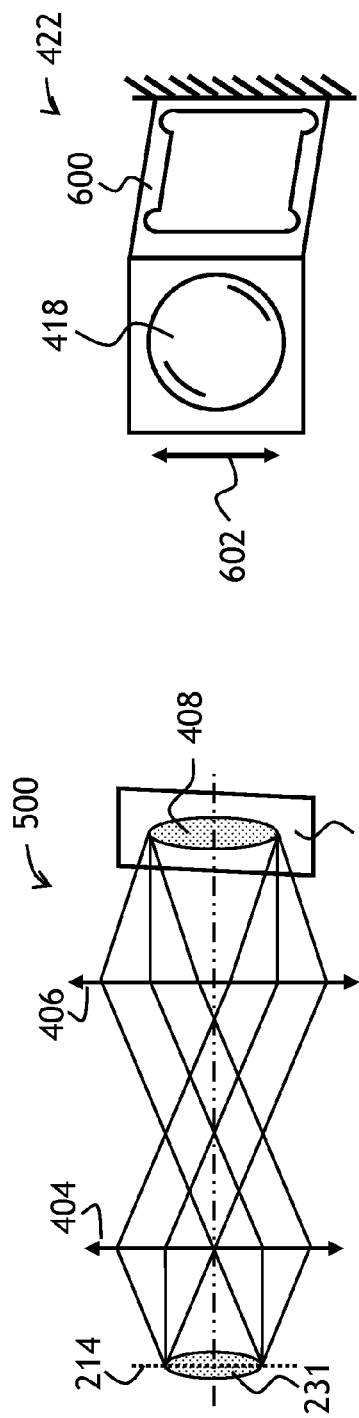

VARYING BEAM PARAMETER PRODUCT OF A LASER BEAM

CROSS-REFERENCE TO RELATED APPLICATIONS

The present invention claims priority from U.S. Patent Application No. 61/569,012 filed Dec. 9, 2011, which is incorporated herein by reference.

TECHNICAL FIELD

The present invention relates to laser material processing, and in particular to laser beam delivery.

BACKGROUND OF THE INVENTION

Laser material processing has many advantages, including high productivity, a non-contact nature of processing, improved quality, and high precision and mobility of the laser beam delivery point. Lasers are presently used for cutting, drilling, welding, brazing, surface annealing, alloying, hardening, and other applications. An optical fiber is frequently used to deliver a high-power and/or high-intensity laser beam to a target.

A fiber-delivered laser material processing system typically includes the following components: a laser, for example a fiber laser; an optical coupler unit, also known as a switch box or shutter box; a process fiber (also termed "delivery fiber"), typically 10-50 m long, in a reinforced cable and pluggable on both ends; and a process head. The process head is an optical assembly that includes a receptacle for the process fiber, optics for projecting the laser power, and any required accessories for laser-based processing, such as assist-gas ports. The laser emission is transmitted into the optical coupler unit, either through free space or through a separate optical fiber. The optical coupler unit launches the emission into the process fiber, which transmits the laser light to the process head. The process head projects the laser light onto a workpiece to perform the required processing task.

Such systems are used with many different process types, including cutting, welding, heat treatment, etc., and with many different material types, thicknesses, and geometries. The desired focal spot size, divergence, and beam quality at the workpiece vary widely depending on the process type and associated process parameters. Because the process head is typically an imaging device, constructed to create the best possible spot using the fewest components, the spot near the workpiece is typically an image of the spot, or more specifically the beam waist, at the process fiber output, scaled by the magnification of the process head. The product of beam-waist radius and divergence (half-angle) is an invariant called the beam-parameter product (BPP), expressed in units of millimeter-milliradians (mm-mrad).

To create different spot sizes and/or different divergences of the laser beam, one usually swaps out the process fiber with another fiber of different core size, or swaps the process head with another head of a different magnification. The process of physical swapping of the delivery fiber and/or the process head is time-consuming and inconvenient, and can result in contamination or even damage of sensitive fiber tips.

Trumpf GmbH, of Ditzingen, Germany, recently reported specially constructed delivery fibers containing two different-sized waveguides, one central core surrounded by a cladding layer and then by an annular second core, giving the user the choice of a round beam or a larger doughnut-shaped beam (PCT Patent Application WO 2011/124671A1), thereby providing two discrete BPP values. The gross selection available by this technique is usable for switching between cutting and welding, for example, but for fine-tuning a process or switching among a variety of process types, it is much more useful to have a continuous BPP variability.

Ortiz in U.S. Pat. No. 5,245,682 discloses a beam quality control system, in which the divergence at the output end of a delivery fiber is controlled by switching the divergence of the laser beam focused into the delivery fiber. Referring to FIGS. 1A to 1C, a fiber-coupled laser system 100 of Ortiz includes a laser 101, three lenses 102A-102C having different focal lengths, and a delivery fiber 103 having input and output ends 104 and 105, respectively. The lenses 102A-102C are mounted on translation stages 110 allowing the lenses 102A-102C to be inserted into a beam path 106 of a laser beam 107 emitted by the laser 101, one at a time. For example, in FIG. 1A the first lens 102A, having the largest focal length of the three lenses 102A-102C, is inserted into the beam path 106, resulting in the smallest beam convergence angle $\alpha$ of a converging laser beam 108 focused onto the input end 104 of the delivery fiber 103. In FIGS. 1B and 1C, the convergence angle $\alpha$ of the converging laser beam 108 progressively increases with the decreasing focal length of the second and third lenses 102B, 102C, respectively.

Due to its relative stiffness and absence of sharp bends afforded by a stiff housing, the delivery fiber 103 preserves ray angles inside the delivery fiber 103, resulting in divergence angles $\beta$ of a diverging laser beam 109 at the output end 105 being close to the corresponding convergence angles $\alpha$ of the converging laser beam 108. Therefore, when the lenses 102A to 102C are switched, the divergence angle $\beta$ of a diverging laser beam 109 changes in a step-like fashion, which allows one to switch the BPP of the diverging laser beam 109 delivered to a workpiece, not shown. Detrimentally, the Ortiz system requires the lenses 102A-102C and/or the input end 104 of the fiber 103 to be re-positioned or aligned with a micrometer precision, which limits the practical applicability of such a system. Further, the laser beam 107 needs to be interrupted for the switching to take place, which may be inconvenient or even detrimental in some applications. Furthermore, since it is the optical power density or intensity of the focused laser beam that is primarily responsible for the laser processing action, it is the spot size, and not just the output beam divergence, that needs to be varied.

Imakado et al. in U.S. Pat. No. 7,151,788 disclose a laser processing device, in which the BPP of the laser beam delivered to a workpiece is also varied by varying the input divergence, resulting in varying output divergence at the output of the delivery fiber. A condensing lens re-focuses the laser beam exiting the delivery fiber into a focal spot on a target. A focal spot size achievable by the condensing lens depends on the divergence of the laser beam exiting the delivery fiber, which suggests that the lens must have significant levels of aberration. As a result, when the input divergence is varied, the focused spot size is varied. Detrimentally, when such a system is adjusted for high BPP, the focused spot will be blurry and will lack a well-defined edge that is desirable for machining. Additionally, the variation of the spot size as a function of divergence will likely be relatively modest; the divergence change will probably make much more of a contribution to the overall BPP change than will the spot size.

The prior art lacks a laser material processing system, in which the BPP, and in particular the spot size, would be varied smoothly, continuously, and in real time, with a well-defined focal spot. Accordingly, it is a goal of the invention to provide such a laser material processing system and method.

SUMMARY OF THE INVENTION

The present invention uses the divergence-preserving property of the delivery fiber to create a controllable beam waist size at or near the fiber output by placing a small angle-to-offset lens near the exit end of the delivery fiber. The angle-to-offset lens, herein termed "exit lens", has a very short focal length, for example 10 mm or less, more preferably 1 mm or less. The function of the exit lens is to transform the preserved angular distribution of rays inside the fiber into a ray coordinate distribution, thus creating a small, well-defined beam waist at or near the focal plane of the exit lens proximate the output end of the delivery fiber. The size of the spot depends almost linearly on the divergence, which can be varied by varying an input convergence angle of the laser beam focused onto the fiber tip, to vary the spot size.

Instead of (or in addition to) varying the input convergence angle, a launch angle into the delivery fiber can be varied. Conveniently, this can be done by displacing a laser beam in front of an "entry lens", which can be made similar or identical to the exit lens. The entry lens focuses light into the delivery fiber. Due to its rotational symmetry, the delivery fiber quickly averages the azimuthal angles of individual rays inside the fiber. As a result, the output divergence is substantially rotationally symmetrical. When the laser beam is displaced in front of the entry lens, the symmetrical output divergence is varied, and the exit lens transforms that variation into a variation of the spot size at the output of the delivery fiber—exit lens assembly. The delivery fiber can be made integral with the entry and exit lenses, which are preferably graded-index (GRIN) lenses. End caps can be fused to the outside optical surfaces of the GRIN lenses. The entrance and exit surfaces of the end caps can be antireflection coated. A regular step-index delivery fiber is preferred, although other fiber types can be used as well, as will be explained.

In accordance with the invention, there is provided an optical device for varying a beam parameter product of a laser beam, the device comprising:

an input port for inputting the laser beam into the optical device;

a beam launcher optically coupled to the input port; and an optical waveguide subassembly optically coupled to the beam launcher, the optical waveguide subassembly comprising an optical waveguide having first and second ends, a core, and a cladding surrounding the core, the core and the cladding extending between the first and second ends of the optical waveguide, and an exit lens coupled to the second end;

wherein the beam launcher is configured for launching the laser beam at a convergence angle and a launch angle into the core of the waveguide at the first end of the waveguide, wherein the beam launcher is configured for varying one or more of the convergence angle and the launch angle;

wherein in operation, the launched laser beam propagates from the first to the second end of the optical waveguide and through the exit lens, forming a first laser beam waist proximate the exit lens, the first laser beam waist having a diameter, wherein a distribution of local ray angles at the second end of the optical waveguide is substantially rotationally symmetric about the waveguide axis proximate the second end, wherein, when the beam launcher varies the convergence angle and/or the launch angle, the diameter of the first laser beam waist proximate the exit lens is varied, thereby varying a beam parameter product of the laser beam exiting the exit lens.

In one embodiment, the divergence of light inside the fiber is adjusted by using a divergence adjusting element coupled to the optical waveguide between the first and second ends of the waveguide. The divergence adjusting element can include a mechanical presser creating microbends in the optical waveguide, and/or a section of heated or stressed graded index waveguide section fused to the delivery waveguide. In operation, the element adjusts divergence of the laser beam inside the optical waveguide, thereby varying a diameter and/or a divergence of a first laser beam spot at the focal plane of the exit lens.

In accordance with another aspect of the invention, there is further provided a laser beam delivery system for delivery of a laser beam to a target at a variable beam parameter product, the laser beam delivery system comprising:

any one of the optical devices described above, for varying a beam parameter product of a laser beam; and a process head coupled to the optical device, the process head comprising a focusing element coupled to the exit lens, for imaging the first laser beam spot onto a second laser beam spot on the target.

In accordance with another aspect of the invention, there is further provided a method for varying a beam parameter product of a laser beam, comprising:

(a) providing an optical waveguide having first and second ends, a core, and a cladding surrounding the core, the core and the cladding extending between the first and second ends of the optical waveguide, and an exit lens coupled to the second end;

(b) launching the laser beam at a convergence angle and/or at a launch angle into the first end of the optical waveguide;

(c) propagating the laser beam launched in step (b) in the optical waveguide from the first end to the second end, so as to enable ray angles of the laser beam guided by the optical waveguide to form a substantially rotationally symmetric distribution at the second end, while substantially preserving a distribution of magnitudes of the local ray angles with respect to an optical axis of the optical waveguide;

(d) directing the laser beam through the exit lens, forming a first laser beam waist in the laser beam exiting the exit lens, wherein the first laser beam waist is substantially rotationally symmetric due to the rotational symmetry of the ray angles at the second end of the optical waveguide formed in step (c); and (e) varying the convergence angle and/or the launch angle, to vary a beam parameter product of the laser beam exiting the exit lens.

BRIEF DESCRIPTION OF THE DRAWINGS

Exemplary embodiments will now be described in conjunction with the drawings, in which:

FIG. 4 is a schematic cross-sectional view of a laser beam delivery system of the invention;

FIG. 5 is an optical ray trace diagram of the process head of the laser beam delivery system of FIG. 4;

FIG. 6 is a frontal view of an offset lens of the laser beam delivery system of FIG. 4 mounted on a flexure mount;

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

A typical step-index fiber always delivers a beam of roughly the same spot size at the output end of the fiber, because the beam is confined by the perimeter of the step-index core. However, the divergence angle of the light inside the fiber remains conserved in the case of an ideal fiber, as long as it is less than the maximum bounce angle supported by the fiber, which is given by $$\sin^{-1}(NA) = \sin^{-1}(\sqrt{(n_1^2 - n_2^2)}) \quad (1)$$

Herein, NA is the fiber numerical aperture, $n_1$ is the refractive index of the core, and $n_2$ is the refractive index of the cladding. Throughout this disclosure, all bounce angles and divergences are expressed in terms of angles in air. Inside the fiber, the angles are decreased in accordance with Snell's law.

In an actual fiber, the divergence angle is not perfectly conserved due to fiber micro- and macro-bending and imperfections in the size, shape, and refractive-index homogeneity of the core. In typical modern process fibers or waveguides, an acceptable level of the divergence angle preservation is achieved by precise fabrication, by the use of a large outer diameter to make the fiber stiff enough to reduce the occurrence of bends, and by the use of a small core diameter. By way of example, the outer diameter of the glass cladding part of process waveguides can be 250 micrometers or greater, often 400 micrometers or greater, and the core diameter can be 200 micrometers or less, often 100 micrometers or 50 micrometers or less. In such waveguides, light with an internal divergence angle of 0.10 radians, for example, can be propagated over distances of tens of meters with an increase of divergence of not more than 10%-20%. This substantial preservation of divergence can be used to obtain a desired spot size by launching a laser beam at a controlled convergence angle to create a pre-defined divergence of the laser beam inside the waveguide, while disposing a small lens near the exit end of the waveguide, which converts the preserved divergence into a spot size at a focal plane of the lens.

Figure 1A:
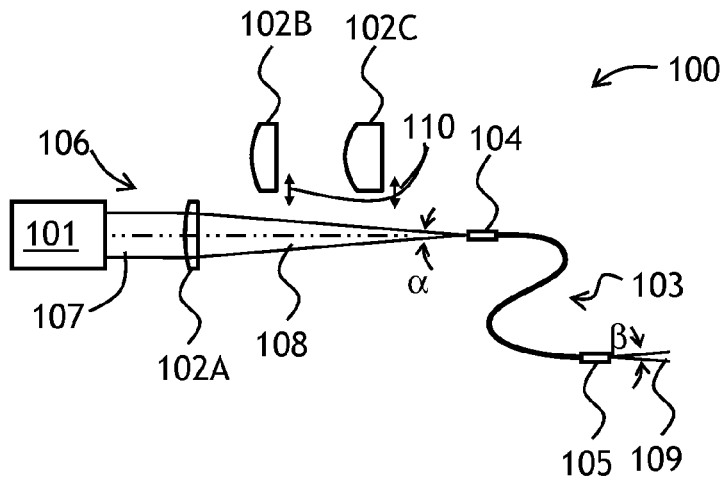
FIGS. 1A to 1C are schematic views of a prior-art fiber-coupled laser system with switchable divergence of a fiber-delivered laser light.
Figure 1B:
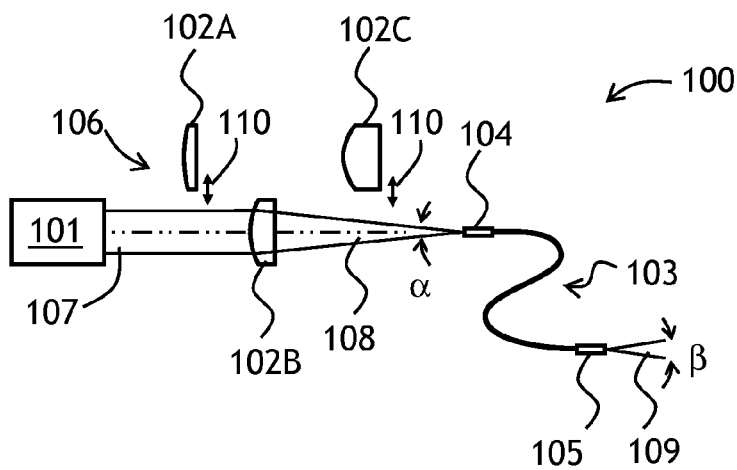
Figure 1C:
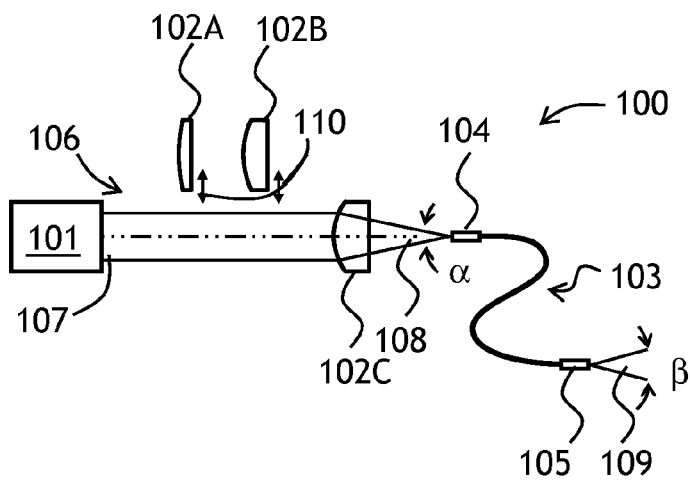
Figure 2A:
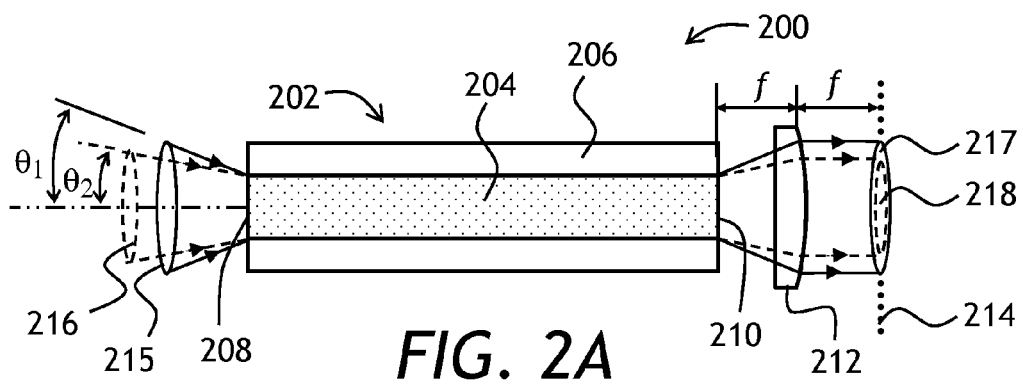
FIG. 2A is a longitudinal cross-sectional view of an optical waveguide subassembly of the invention.

Referring to FIG. 2A, an optical waveguide subassembly 200 of the invention includes an optical waveguide 202 having a core 204 and a cladding 206 surrounding the core 204 between first and second ends 208 and 210, respectively, of the optical waveguide 202, and an exit lens 212 optically coupled to the second end 210. In the embodiment shown, the exit lens 212 has a focal plane 214 disposed outside the optical waveguide 202 and opposite the second end 210 of the optical waveguide 202. In the approximation that the exit lens 212 is a thin lens, the lens 212 is disposed approximately one focal length f away from the second end 210, and the focal plane 214 is disposed one focal length f past from the exit lens 212. The second end 210 and the lens 212 can be disposed not exactly one focal length f away from each other, with a variation of 20-40% away from one f distance.

In operation, a first laser beam 215, shown with solid lines, is launched at a first convergence angle $\theta_1$ into the core 204 at the first end 208 of the optical waveguide 202. The first laser beam 215 exits the optical waveguide 202 at its second end 210 and gets collimated by the exit lens 212, forming a first laser beam waist 217 at the focal plane 214 of the exit lens 212. The first waist 217 is shown with solid lines. To illustrate how the input convergence angle $\theta$ influences the output beam waist size, a second laser beam 216, shown with dashed lines, is launched at a second convergence angle $\theta_2$, which is smaller than the first convergence angle $\theta_1$, into the core 204 at the first end 208 of the optical waveguide 202. The second laser beam 216 exits the optical waveguide 202 at its second end 210 and gets collimated by the exit lens 212, forming a second beam waist 218 at the focal plane 214 of the exit lens 212. The second waist 218 is shown with dashed lines. The second waist 218 is smaller than the first waist 217. Thus, when the input convergence angle $\theta$ is varied, the beam waist size at the focal plane of the exit lens 212 of the optical waveguide subassembly 200 is varied as well, in approximately proportionate manner for small angles $\theta$.

In the embodiment shown in FIG. 2A, the beam waist 217 is formed at the focal plane 214, one focal length f away from the exit lens 212. The beam waist 217 can also be formed somewhere proximate the exit lens 212, and the diameters of the beam waist 217 will be variable as described above. In FIG. 2A, the waist 217 coincides with the focal spot, but that need not always be the case.

Throughout the specification, the beam waist 217 is defined as the spot where the laser beam has its minimum lateral size, called herein "waist diameter". It is to be understood that, although the term "diameter" is used, the beam waist 217 needs not be exactly circular. As typically measured by those skilled in the art, the waist diameter can be measured using, for example, the second-moment or the 86%-power-enclosed methods. The waist 217 may be real, that is, be disposed in or after the focal plane 214 of the exit lens 212, or virtual, that is, appearing to be located before the focal plane 214 of the exit lens 212, or even before the exit lens 212. In most of the embodiments discussed herein, the waist 217 is real, but in the case of the non-quarter-pitch GRIN or the aberrated GRIN lens 212, it is possible to obtain a virtual waist 217 disposed within the lens 212, or even within the optical waveguide 202 proximate to, for example within 10 millimeters, of the second end 210 of the optical waveguide 202.

Figure 2B:
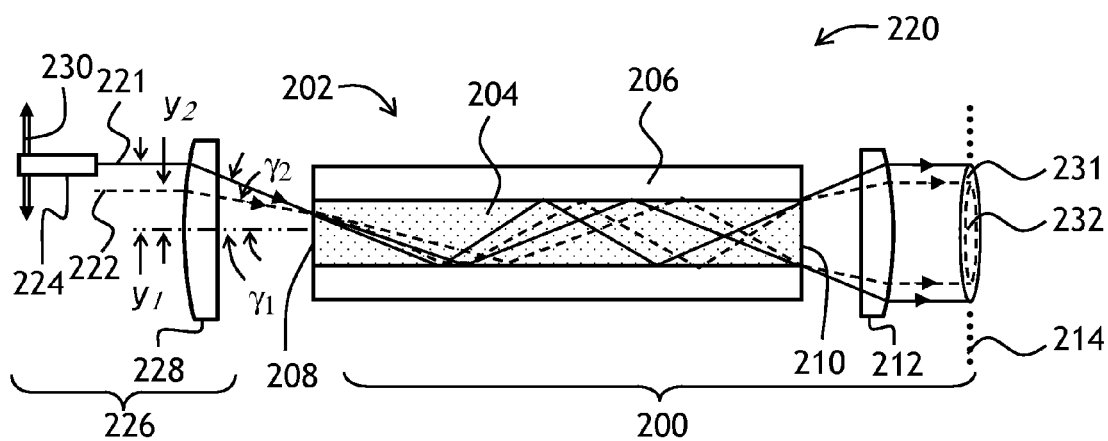
FIGS. 2B and 2C are longitudinal cross-sectional views of an optical device for varying a beam parameter product of a laser beam, the optical device including the subassembly of FIG. 2A.

Turning to FIG. 2B, an optical device 220 for varying a beam parameter product of a first laser beam 221 includes an input port 224 for inputting the first laser beam 221 into the optical device 220, a beam launcher 226 optically coupled to the input port 224, and the optical waveguide subassembly 200 optically coupled to the beam launcher 226. The beam launcher 226 includes an entry lens 228 for launching the first laser beam 221 impinging thereon into the first end 208 of the optical waveguide 202, and a shifter 230, for example a translation stage, for providing a variable lateral displacement $y_1$ between the first laser beam 221 and an optical axis of the entry lens 228, for launching the first laser beam 221 at a variable launch angle $\gamma_1$ into the core 204 at the first end 208 of the optical waveguide 202.

In operation, the optical waveguide 202 averages the azimuthal angles of individual rays of the launched first laser beam 221 inside the optical waveguide 202, forming a first waist 231 at the focal plane 214 of the exit lens 212. As a result, a distribution of local ray angles at the second end 210 of the optical waveguide 202 is substantially rotationally symmetric about the waveguide axis proximate the second end 210. The core 204 is substantially filled with light of the laser beam 221 near the second end 210 of the optical waveguide 202.

To illustrate how the launch angle $\gamma$ influences the output spot size, a second laser beam 222, shown with dashed lines, is launched at a second lateral displacement $y_2$, smaller than the first lateral displacement $y_1$. The entry lens 228 causes the second laser beam 222 to impinge onto the first end 208 of the optical waveguide 202 at a second launch angle $\gamma_2$ smaller than the first launch angle $\gamma_1$, launching the second laser beam 222 into the core 204 at the first end 208 of the optical waveguide 202. The optical waveguide 202 averages the azimuthal angles of individual rays of the launched second laser beam 222 inside the optical waveguide 202, forming a second waist 232 at the focal plane 214 of the exit lens 212. The second waist 232 has a smaller diameter than the first waist 231. Thus, when the convergence angle $\theta$ and/or the launch angle $\gamma$ of the laser beam 221 is varied by the beam launcher 226, a diameter of the laser beam waist 231 at the focal plane 214 of the exit lens 212 is varied, whereby the beam parameter product of the laser beam exiting the exit lens 212 is varied.

The beam launcher 226 can also be configured for varying the input convergence angle $\theta$ as shown in FIG. 2A, using devices and methods known in the art. Furthermore, the beam launcher 226 can also be configured for simultaneously varying the input convergence angle $\theta$ and the launch angle $\gamma$.

Figure 2C:
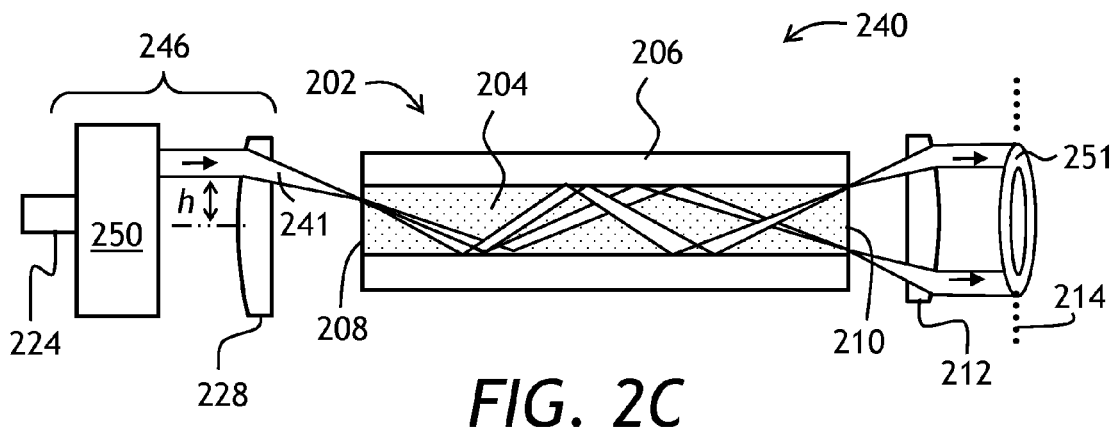

Simultaneous variation of the input convergence angle $\theta$ and the launch angle $\gamma$ opens up some interesting possibilities, allowing the optical device 220 to be used not only to vary the size of the waists 217, 218, 231, 232, but also to vary the shape of the waists 217, 218, 231, 232, that is, a distribution of the optical power density within the waists 217, 218, 231, 232. Referring now to FIG. 2C with further reference to FIG. 2B, an optical device 240 is similar to the optical device 220 of FIG. 2B, the difference being that a beam launcher 246 includes a variable device 250 for simultaneously varying the size and position of an input laser beam 241, thereby simultaneously varying the input convergence angle $\theta$ and the launch angle $\gamma$ of the input laser beam 241. In FIG. 2C, the launch angle of individual rays, not shown, of the laser beam 241 does not include zero launch angles. Upon propagation in the core 204 of the optical waveguide 202 and through the exit lens 212, the laser beam 241 forms a spot 251 of an annular (doughnut) shape. The shape of the spot 251 can be adjusted to form Gaussian shape, the doughnut shape as shown, or a flat-top shape if so required. By way of a non-limiting example, the variable device 250 can include a zoom lens, not shown, for expanding or contracting the diameter of the optical beam 241, equipped with a translator similar to the translator 230, to offset the zoomed laser beam 241 by a predefined amount. Other configurations of the beam launcher 226 and the variable device 250 are possible, for as long as these configurations launch the laser beams 221, 241 at the variable convergence angle $\theta$ and/or the variable launch angle $\gamma$.

Figure 3A:
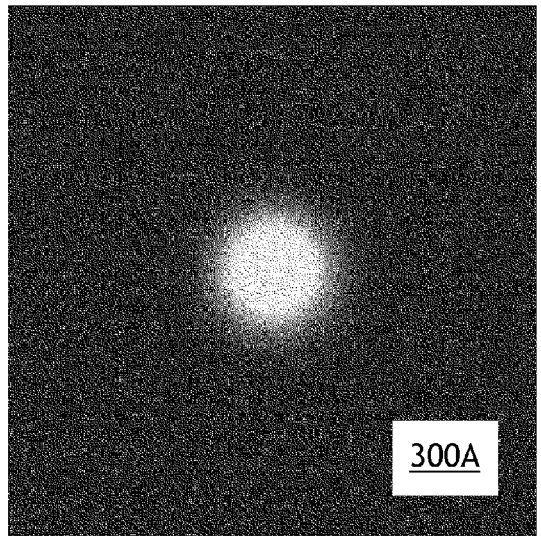
FIGS. 3A to 3D are simulated spot diagrams of a laser spot at the output of the optical waveguide subassembly of FIG. 2C.
Figure 3B:
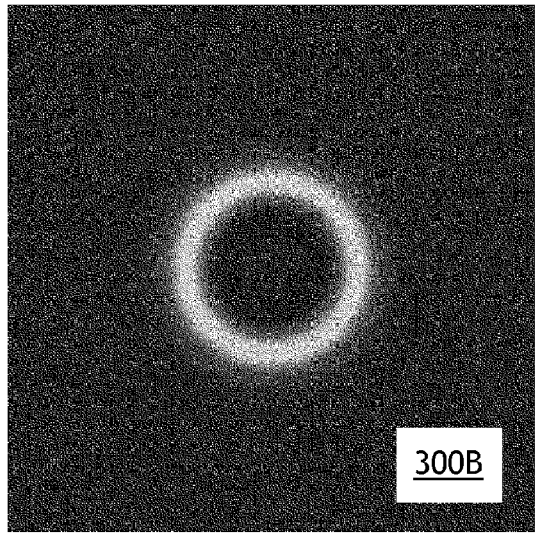
Figure 3C:
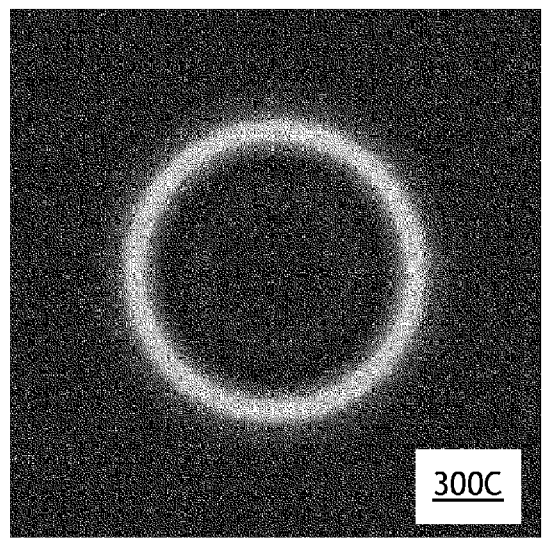

Referring now to FIGS. 3A to 3D with further reference to FIG. 3C, simulated spot shapes 300A to 300D correspond to the spot 251 at gradually increasing y-coordinate, or height h, of the laser beam 241, in going from FIG. 3A to FIG. 3D. In FIG. 3A, the spot 300A is substantially flat-top; and in FIG. 3B to 3D, annular or doughnut shape spots 300B to 300D of gradually increasing diameter are formed. In going from FIG. 3A to 3D, the diameter increases from 30 to 100 micrometers. The flat-top spot 300A can be preferable for some applications, for example for some types of laser welding and laser heat treatment; doughnut shaped spots 300B to 300D can be preferable for other applications, including cutting thick sheet metal, such as mild steel.

Referring back to FIGS. 2A to 2C, the focal length of the exit lens 212 is preferably small, for example no greater than 10 mm, and more preferably no greater than 1 mm. When using a GRIN lens that is not a quarter pitch or an odd multiple thereof, then it lacks a well-defined focal length; however, such a GRIN lens should have a refractive index profile that, when used in a length of one-quarter pitch, would yield a focal length of no greater than 10 mm, and more preferably no greater than 1 mm. When the focal length of the exit lens 212 is small, the first waist 217, 218, 231, 232, or 251 at the focal plane 214 is also small, which enables its imaging onto a workpiece (not shown) at a small laser beam spot size. Small spot sizes on the workpiece enable high optical power densities normally required for laser material processing. Using typical numbers, the optical waveguide core 204 could be 50 micrometers in diameter with a numerical aperture (NA) of 0.22. The optical waveguide 202 could be illuminated with light of 0.10 radians maximum divergence. Thus, the user would image a fixed 50 micrometer, 0.10 radian spot onto the workpiece. In one embodiment of the present invention, an adjustable beam launch system would be used to launch light into the optical waveguide 202 with anywhere between 0.06 radians and 0.20 radians divergence. Using the exit lens 212 having a focal length f=250 micrometers at the second end 210 of the optical waveguide 202, the output beam can be converted to a fixed divergence $\theta_{OUT}=\sin^{-1}(25/250)=0.10$ radians, and a variable waist diameter of anywhere between 2R=2×250×0.06=30 micrometers and 2R=2×250×0.20=100 micrometers, where the waist diameter is proportional to the beam divergence inside the optical waveguide 202. The BPP thus varies from 0.10×30/2=1.5 mm-mrad to 0.10×100/2=5 mm-mrad in this example. The small diameter of the laser beam waist 217 or 218 enables its imaging onto a workpiece at practically usable spot sizes on the workpiece.

One characteristic of circular-core waveguides is that, in contrast to non-circular core waveguides, they do not mix skew, or off-axis, rays with meridional, or on-axis, rays, with the result that if the intensity distribution at the first end 208 of the waveguide 202 is not radially uniform, then it will also not, in general, be radially uniform at the second end 210 of the waveguide 202. In one embodiment, the core 204 has a non-circular cross-section for facilitating formation of a uniform radial distribution of laser intensity at the second end 210 of the optical waveguide 202, thereby facilitating a uniform angular illumination of the first laser beam waists 217, 218, 231, 232, or 251, which may be preferable in certain applications. Preferred non-circular core shapes for ensuring a uniform angular illumination include, without limitation, square, rectangular, triangular, hexagonal, octagonal, D-shaped, rippled, cusped, and star-shaped. A length of the optical waveguide 202 between its first and second ends 208 and 210 is preferably at least 1 m. Further, preferably, the cladding 206 has a diameter of at least 250 micrometers to increase stiffness and reduce fiber bends, for improved preservation of the ray angle magnitudes. Advantageously, the cladding 206 is a $SiO_2$ cladding for improved high power handling, although other cladding types can be used. The optical waveguide 202 can also include a polarization-maintaining, polarizing, chiral, or spun waveguide for controlling polarization of the laser beam inside the optical waveguide 202.

Turning now to FIG. 4, a laser beam delivery system 400 includes the optical device 220 of FIG. 2B and a process head 402 comprising collimating and focusing lenses 404, 406, respectively, the collimating lens 404 being coupled to the exit lens 212 of the optical waveguide subassembly 202. The process head images the laser beam waist 231 onto a second laser beam waist 408 on a target (workpiece) 410, as shown with rays 412. The translator or shifter 230 includes collimating and focusing lenses 414 and 416, respectively, and a laterally displaceable lens 418, disposed upstream of the entry lens 228 between the collimating and focusing lenses 414 and 416, for laterally displacing the laser beam 221, as shown with rays 420. The laterally displaceable lens 418 is mounted on a translation stage 422. The collimating and focusing lenses 414 and 416 of the shifter 230 are two strong lenses that are fixed in position, aligned for precise coupling into the center of the entry lens 228. The laterally displaceable lens 418 is a weak lens that can be adjusted laterally to displace the laser beam 221 relative to the optical axis of the entry lens 228. The movement of the laser beam 221 in this case is in proportion to the movement of the laterally displaceable lens 418, scaled by the ratio of the focal lengths of the laterally displaceable lens 418 to that of the focusing lens 416. Thus, the system 400 allows very precise movement and/or tilting of the laser beam 221 relative to the optical axis of the entry lens 228. For example, if the ratio of the focal lengths of the laterally displaceable lens 418 to of the focusing lens 416 is 1:20, then a 1-micrometer fine adjustment of the laser beam 221 position can be achieved with a 20-micrometer movement of the laterally displaceable lens 418, which is very easy to perform using standard mechanical actuators. It is alternatively possible to omit the lens 418 and adjust the position of laser beam 221 by moving either or both of the lenses 414 and 416, or by adjusting the direction of the beam between the lenses 414 and 416 by adjusting, for example, a mirror, not shown, disposed in the beam path between the lenses 414 and 416.

As noted above, it is highly preferable that the exit lens 221 is a small and "strong" lens having a short focal length of no greater than, for example, 1 mm. Using a conventional lens having a large focal length of several millimeters in place of the exit lens 212 could result in an unacceptably large beam diameter for a process head to image onto the workpiece 410. It is, therefore, preferable to use a lens of very short focal length integrated directly onto the optical waveguide 202, so that the new process fiber assembly is a drop-in replacement for prior-art process fibers. Short focal length lenses can be implemented by fusing onto the first end 208 of the optical waveguide 202 either a fiber end cap with a convex outer optical surface, as shown in FIG. 4, or a graded-index lens, resulting in a monolithic structure. Alternatively, discrete microlenses can be mounted rigidly in a close proximity to the ends 208 and 210 of the optical waveguide 202, providing the same functionality as the end cap lenses or the graded-index lenses, but with the disadvantage of adding two optical surfaces and a potentially more unstable and contamination-prone optical path than when the entry and exit lenses 228 and 212, respectively, are fused onto the optical waveguide 202. In one embodiment, the entry and exit lenses 228 and 212 have a same focal length. The entry and exit lenses 228 and 212 can even be identical lenses fused to the ends 208 and 210 of the optical waveguide 202, so that the resulting monolithic structure is symmetrical and can be used with either one of the lenses 228 or 212 facing the translator 230.

Turning to FIG. 5, an optical ray trace diagram 500 illustrates imaging of the first laser waist 231 at the focal plane 214 of the exit lens 212 onto the second waist 408 at the target 410. Preferably, an image magnification factor of the lenses 404 and 406 of the process head 402, defined as a ratio of diameters of the second and the first laser beam waists 408 and 231, respectively, substantially does not depend on a variation of a divergence of the laser beam at the focal plane 214. This allows for sharper imaging of the first laser beam waist 231 onto the target 410, because absence of angular dependence of the magnification ratio on the input divergence is an indicator of low aberrations, enabling sharper imaging.

Referring to FIG. 6, the laterally displaceable lens 418 can be mounted on a flexure mount 600 for displaceably mounting the laterally displaceable lens 418 as indicated by an arrow 602. The flexure mount 600 operates below the elastic threshold, allowing a very large number of laterally displacements of the lens 418, with little or no change in spring parameters of the flexure mount 600. The flexure mount 600 is a part of the translator 422 of FIG. 4.

Figure 7:
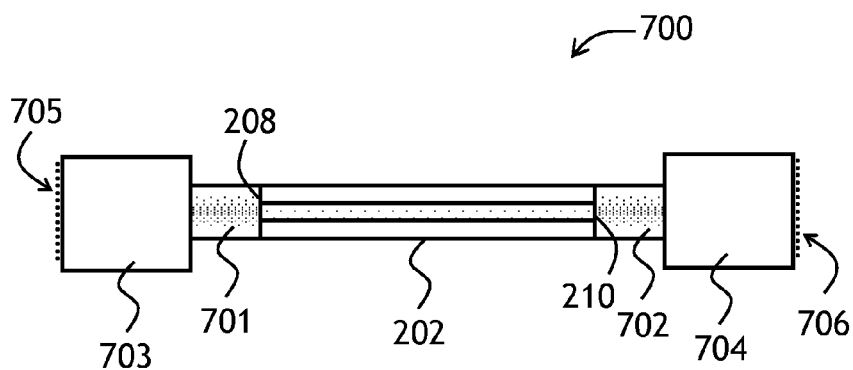
FIG. 7 is a side elevational view of a waveguide subassembly of the invention including a delivery fiber, GRIN entry and exit lenses, and a pair of end caps.

Turning to FIG. 7 with further reference to FIG. 4, a laser beam delivery waveguide assembly 700 of the invention can be used in the laser beam delivery system 400. The laser beam delivery waveguide assembly 700 includes the step-index optical waveguide 202 having the first and second ends 208 and 210, respectively, for guiding a laser beam from the first to the second end 208 to 210, respectively. First and second graded-index optical elements 701 and 702 are fused to the first and second ends 208 and 210, respectively, for coupling the laser beam into the first end 208 and out of the second end 210, respectively, of the optical waveguide 202. The first and second graded-index optical elements 701 and 702, which can be, for example, GRIN lenses, correspond to the entry and exit lenses 228 and 212, respectively, of the laser beam delivery system 400. First and second end caps 703 and 704, respectively, are fused to the first and second graded-index optical elements 701 and 702, respectively, for transmitting the laser beam to the first graded-index optical element 701 and from the second graded-index optical element 702, respectively. Outer optical surfaces 705 and 706 of the first and second end caps 703 and 704, respectively, can be anti-reflection (AR) coated. Furthermore, the outer optical surfaces 705 and 706 of the first and second end caps 703 and 704, respectively, can be curved to facilitate focusing of the laser beam into the first end 208 of the optical waveguide 202 and collimation of the laser beam exiting the second end 210 of the optical waveguide 202, respectively.

Figure 8:
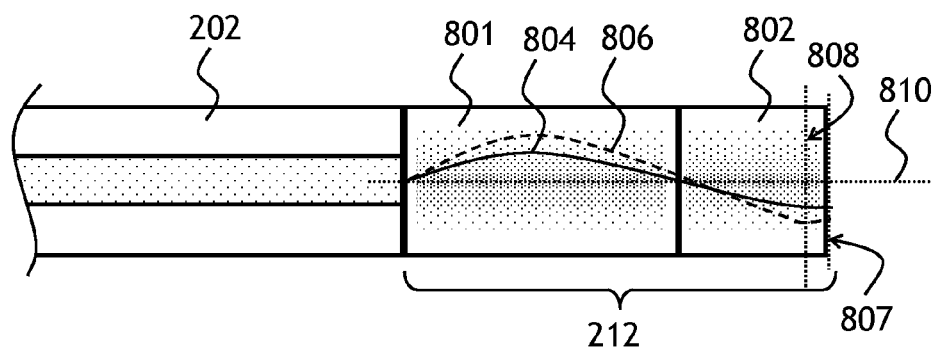
FIG. 8 is a side elevational view of a compound GRIN exit lens according to the invention.

In one embodiment, the exit lens 212 has an aberration selected for creating a desired mixture of a variable divergence of the laser beam exiting the exit lens 212 and the variable diameter of the first laser beam waist 217, for additionally varying the beam parameter product of the laser beam exiting the exit lens 212 at a rate that is greater or less than the rate of variation of the spot size. Referring now to FIG. 8, the exit lens 212 comprises a first gradient index optical element 801 coupled, preferably fused, to the optical waveguide 202, and a second gradient index optical element 802 coupled, preferably fused, to the first optical element 801. The first gradient-index optical element 801 is of one or integer multiple of a half-pitch length. A radial gradient index profile of the first optical element 801 is substantially non-parabolic for creating the aberration. The second gradient-index optical element is of one or odd-integer multiple of a quarter-pitch length. A radial gradient index profile of the second optical element 802 is substantially parabolic for creating a desired mixture of the variable divergence of the laser beam and the variable laser beam waist diameter.

In operation, a first ray of light 804, shown with a solid line, propagates closely to an optical axis 810 of the first and second graded index optical elements 801 and 802, respectively. For the first ray 804, the focal plane is at an outer surface 807 of the second graded index optical element 802, because the first ray 804 is close enough to the optical axis 810 not to experience significant deviations of the refractive index of the first graded index optical element 801 from the ideal parabolic profile. A second ray of light 806, shown with a dashed line, propagates farther from the optical axis 810. For the second ray 806, the focal plane is at a plane 808 disposed within the second graded index optical element 802, because the first ray 804 is far enough from the optical axis 810 to experience significant deviations of the refractive index of the first graded index optical element 801 from the ideal parabolic profile. As a result, the desired mixture of the variable divergence of the laser beam and the variable laser beam spot size is created as the input launch angle is varied. Alternatively, it is possible to achieve a similar effect by omitting the second gradient-index optical element 802 and utilizing an aberrated first gradient index optical element 801 of length approximately one or an odd-integer multiple of one quarter pitch length.

Yet another method to achieve a desired mixture of variable divergence of the output laser beam and variable waist diameter is to use for the exit lens 212 a gradient-index optical element of length other than one quarter pitch or an odd integer multiple thereof. Using such a non-quarter-pitch length causes the exit lens 212 to be out of focus, whereby both the divergence and the spot size of the laser output vary as the input launch angle is varied.

Referring back to FIG. 2B, in one embodiment of the invention, the laser beam 221 is launched into the first end 208 of the optical waveguide 202 off axis, thus generating skew rays inside the optical waveguide 202. An off-axis launch has the capability of generating an output beam that is annular over an extended distance and that can rotate around the optical axis. Such beams, also known as vortex beams, can have useful properties for certain specialized materials processing applications. The laser beam 221 can be launched off axis, for example, by applying a tilt to the input port 224 in addition to the lateral displacement applied by the shifter 230, by offsetting the entry lens 228 with respect to the optical waveguide 202 or, in the case of using for the entry lens 228 a gradient-index lens, by using an angled entrance surface on such gradient-index lens. Such tilt would preferably be applied perpendicularly to the lateral displacement, that is, perpendicular to the plane of FIG. 2B, in order to ensure that the rays are launched as skew rays. An alternate method to launch the laser beam 221 off axis is to apply a lateral displacement to the beam launcher 226 in a preferably perpendicular direction to the direction of the lateral displacement applied by the shifter 230. Referring again to FIG. 7, for example, the gradient-index optical element 701 would be attached to the waveguide 202 at a slightly laterally displaced position. Such added tilt or displacement should only be applied to the optics preceding the waveguide 202 and not to the optics following waveguide 202, such as the gradient-index element 702. Also, in order to ensure that the skew rays remain preserved during propagation through the waveguide 202, in this embodiment it is preferred that the waveguide core 204 be circular or elliptical in cross section.

Figure 9A:
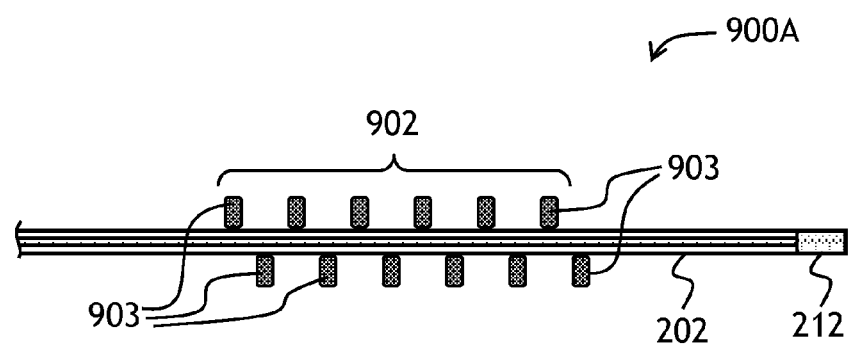
FIG. 9A is a side cross-sectional view of a mechanical divergence adjusting element, creating microbends in the optical waveguide to increase the output divergence.

In one embodiment of the invention, a divergence adjusting element is disposed within, or proximate to a middle section of the optical waveguide 202 to adjust the divergence of the laser beam inside the optical waveguide, thus varying the waist diameter formed by the exit lens 212. Referring to FIG. 9A, a divergence adjusting element 900A includes a mechanical presser unit 902 including a plurality of fingers 903 mechanically coupled to the optical waveguide 202, for creating controllable microbends in the optical waveguide 202. The microbends increase the divergence of the laser beam inside the optical waveguide 202.

Figure 9B:
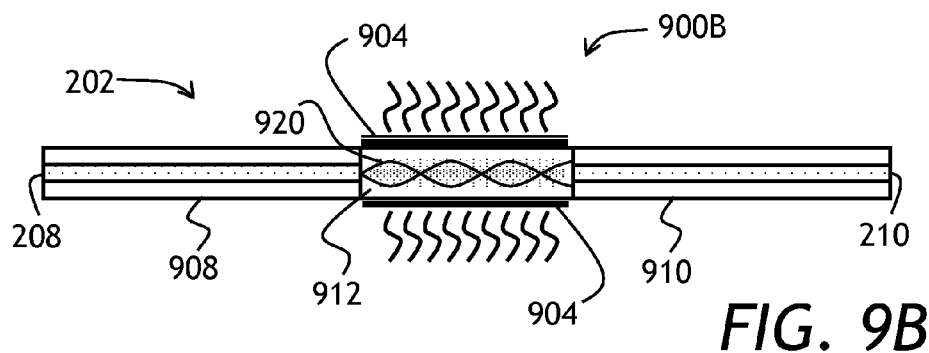
FIG. 9B is a side cross-sectional view of a heated graded-index fiber divergence adjusting element.

Turning now to the embodiment of FIG. 9B, the optical waveguide 202 includes first and second step-index waveguide sections 908 and 910 coupled to the first and second ends 208 and 210, respectively. A third graded-index waveguide section 912 is coupled between the first and second step-index waveguide sections 908 and 910. A divergence adjusting element 900B includes a heater 904 for varying temperature or length, respectively, of the graded index waveguide section 912, thereby varying the divergence of the laser beam inside the optical waveguide 202. The ray trajectories within the graded index waveguide section 912 are shown with rays 920. The core diameter of the second step-index waveguide section 910 is preferably larger than that of the first step-index waveguide section 908, to allow a better light coupling into the second step-index waveguide section 910. The first waveguide section 908 is optional and can be omitted. In this case, the optical beams would be launched directly into the third graded-index waveguide section 912.

An optical device for varying a beam parameter product of a laser beam, using the divergence adjusting elements of the embodiments of FIGS. 9A and 9B, does not require the beam launcher 226 to vary the input convergence angle of the laser beam, because the beam parameter product of the laser beam exiting the exit lens 212 can be varied by adjusting the divergence inside the optical waveguide 202.

Figure 10:
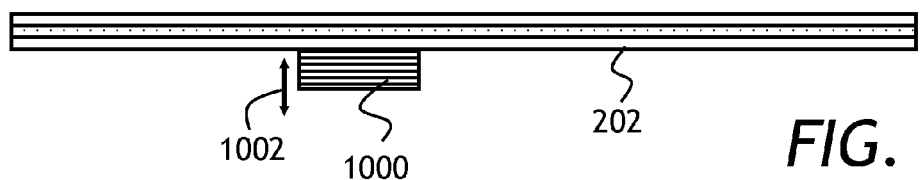
FIG. 10 is a side cross-sectional view of a piezo element coupled to the optical waveguide, for eliminating speckle pattern at the output of the waveguide.

Turning to FIG. 10 with further reference to FIG. 4, a vibrating unit 1000 is preferably coupled to the optical waveguide 202 for vibrating the optical waveguide 202 as shown with an arrow 1002, when the laser beam is launched therein, to reduce a speckle structure of the first laser beam waist 231 and, accordingly, the second laser beam waist 408 on the target (workpiece) 410. The vibrating unit 1000 can include, for example, an acoustic transducer, an ultrasonic transducer, or a mechanical vibrator.

Figures 11A, 11B, 11C:
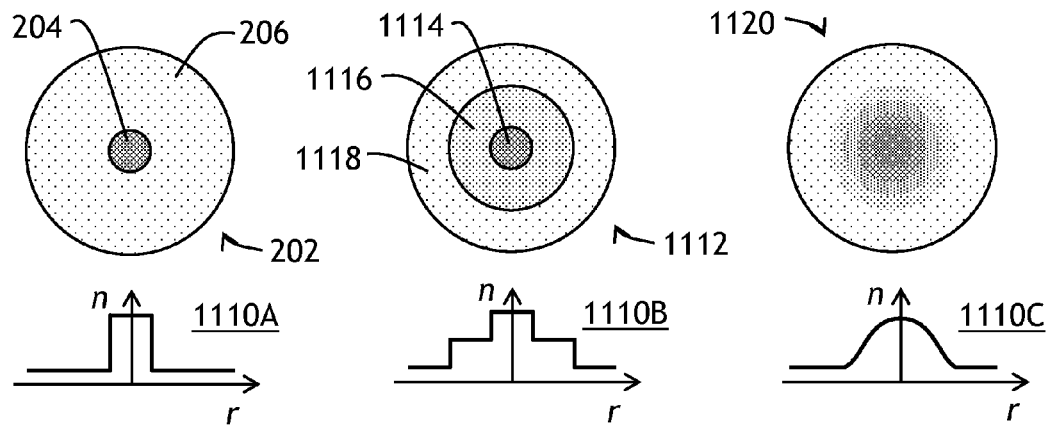
FIGS. 11A to 11C are cross-sectional views of a step-index single-clad fiber; a step-index double-clad fiber; and a graded-index fiber.

The present invention can work with many types of optical delivery waveguides. Referring to FIGS. 11A to 11C, the optical waveguide 202 is shown in cross-section. In FIG. 11A, the optical waveguide 202 is a step-index optical fiber having the core 204 and the cladding 206. An index profile 1110A shows a single refractive index step. In FIG. 11B, a double-clad optical waveguide 1112 has a core 1114 surrounded by first and second claddings 1116 and 1118, respectively. An index profile 1110B shows two refractive index steps corresponding to the core 1114 and the first cladding 1116. In FIG. 11C, a graded-index waveguide 1120 has a gradual variation, preferably a parabolic variation, of the refractive index, as is shown by an index profile 1110C. All these waveguide types can be used in place of the optical waveguide 202. Furthermore, photonic-crystal and/or microstructured waveguides can be used. Photonic crystal waveguides generally can guide laser beams at larger divergences than step-index fibers. Some interesting possibilities afforded by photonic crystal waveguides include a capability to design a desired functional relationship between output waist diameter and output divergence, thus varying the BPP with a pre-defined ratio of varying beam size and the beam divergence at the target 410.

Figure 12:
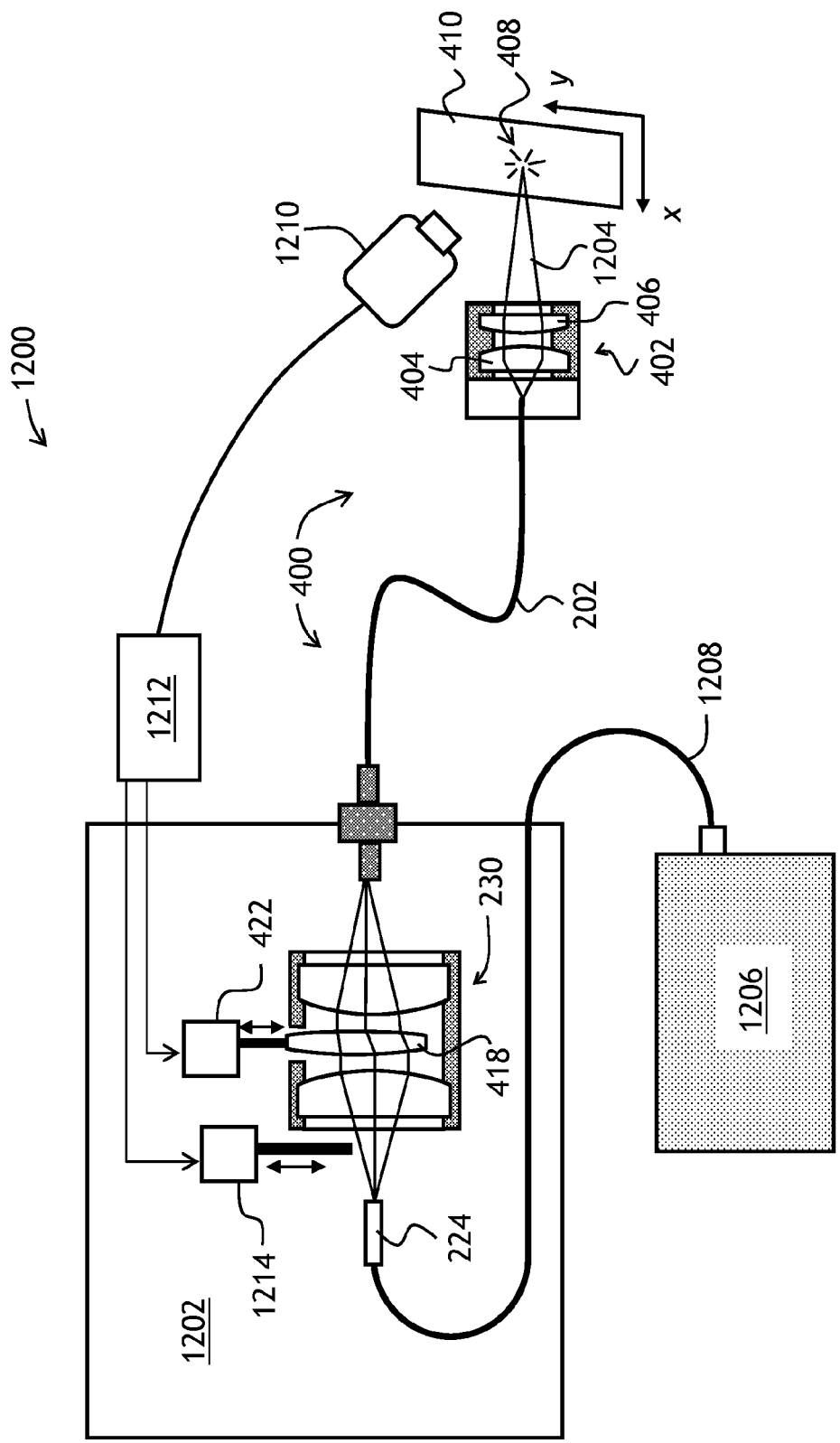
FIG. 12 is a schematic view of a laser material processing system including the laser beam delivery system of FIG. 4.

Referring now to FIG. 12, a laser material processing system 1200 of the invention includes the fiber delivery system 400 of FIG. 4 for delivery of a laser beam 1204 to the target 410. The fiber delivery system 400 is supplemented by a shutter box 1202, and by a camera 1210 for imaging the second laser beam waist 408 (seen in FIG. 4) on the target 410. The laser material processing system 1200 further includes a laser 1206 for providing the laser beam 1204, coupled to the shutter box 1202 via an input fiber 1208, and a camera controller 1212 coupled to the camera 1210. The shutter box 1202 includes a shutter 1214 for providing a controllable interruption of the laser beam 1204 delivered to the target 410. The beam launcher 230 is preferably disposed within the shutter box 1202. The input fiber 1208 is coupled to the input port 224 within the shutter box 1202. The camera controller 1212 is configured for determining a diameter of the second beam waist 408 imaged by the camera 1210, and is coupled to the translator 422 of the laterally displaceable lens 418 for adjusting the lateral position of the laterally displaceable lens 418. The camera controller 1212 is further configured to adjust the convergence angle and/or the launch angle of the laser beam launched into the optical waveguide 202, to reach a pre-determined value of the diameter of the second laser beam waist 408 on the target 410 as explained above. The laser material processing system 1200 can also include a suitably placed Raman filter, not shown, for suppressing light produced by Raman scattering of the laser beam in the optical waveguide 202.

The laser material processing system 1200 can be calibrated by measuring, using the camera 1210, diameters of the second laser beam waist 408 on the target 410, for each displacement of the laterally displaceable lens 418. These measurements are used to create a transfer curve or a lookup table to enable closed-loop operation of the laser material processing system 1200, allowing a dynamic, in-process, real-time variation of the diameter of the second waist 408 on the target 410. For example, in laser cutting, the initial spot size may be reduced to facilitate penetration of the laser beam 1204 through the target 410, and subsequently the spot size can be increased for better cutting operation. Furthermore, the laser material processing system 1200 can be configured to provide second waists 408 on the target 410 of a desirable optical power density distribution, including a flattop distribution of FIG. 3A and annular distributions of FIGS. 3B to 3D.

Generally, a method for varying a beam parameter product of a laser beam includes:

(a) providing the optical waveguide subassembly 200 including the step-index optical waveguide 202 having the first and second ends 208 and 210, respectively, and the exit lens 212 coupled to the second end 210;

(b) launching the laser beam 215 at a variable convergence angle and/or at a variable launch angle into the first end 208 of the optical waveguide 202;

(c) propagating the laser beam 215 launched in step (b) in the optical waveguide 202 to enable ray angles of the laser beam 215 guided by the optical waveguide 202 to form a substantially rotationally symmetric distribution at the second end 210, while substantially preserving a distribution of magnitudes of the local ray angles with respect to the optical axis of the optical waveguide 202;

(d) causing the laser beam 215 propagated in step (c) to exit the second end 210 of the optical waveguide 202 and propagate through the exit lens 212, forming the first laser beam waist 217 in the laser beam exiting the exit lens 212, wherein the first laser beam waist 217 is substantially rotationally symmetric due to the rotational symmetry of the ray angles at the second end 210 of the optical waveguide 202; and (e) varying the convergence angle and/or at the launch angle, to vary the beam parameter product of the laser beam 215 exiting the exit lens 212.

Figure 3D:
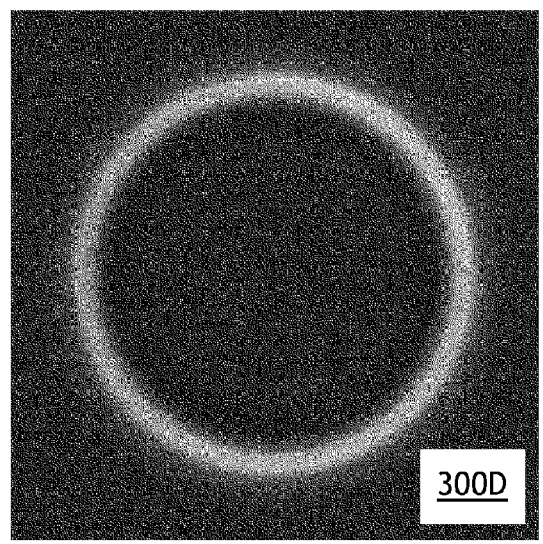

In one embodiment, in step (b), the launch angle does not include zero launch angles, so as to create the first laser beam spot of an annular shape, such as the ones shown in FIGS. 3B to 3D.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An optical device for varying a beam parameter product of a laser beam, the optical device comprising:
   an input port for inputting the laser beam into the optical device;
   a beam launcher optically coupled to the input port; and
   an optical waveguide subassembly optically coupled to the beam launcher, the optical waveguide subassembly comprising
   an optical waveguide having first and second ends, a core, and a cladding surrounding the core, the core and the cladding extending between the first and second ends of the optical waveguide, and
   an exit lens coupled to the second end;
   wherein the beam launcher is configured for launching the laser beam at a convergence angle and a launch angle into the core of the optical waveguide at the first end of the optical waveguide, wherein the beam launcher is configured for varying one or more of the convergence angle and the launch angle;
   wherein in operation, the launched laser beam propagates from the first to the second end of the optical waveguide and through the exit lens, forming a first laser beam waist proximate the exit lens, the first laser beam waist having a diameter,
   wherein a distribution of local ray angles at the second end of the optical waveguide is substantially rotationally symmetric about an optical axis of the optical waveguide proximate the second end, and
   wherein, when the beam launcher varies the convergence angle or the launch angle, the diameter of the first laser beam waist is varied, thereby varying a beam parameter product of the laser beam exiting the exit lens.

2. The optical device of claim 1, wherein the optical waveguide is a step-index waveguide.

3. The optical device of claim 2, wherein the exit lens has a focal length no greater than 10.0 mm.

4. The optical waveguide of claim 3, wherein the exit lens has an aberration selected for creating a desired mixture of a variable divergence of the laser beam exiting the exit lens and a variable diameter of the first laser beam waist, for additionally varying the beam parameter product of the laser beam exiting the exit lens.

5. The optical waveguide of claim 4, wherein the exit lens comprises a first gradient-index optical element coupled to the optical waveguide, and a second gradient-index optical element coupled to the first optical element, wherein the first gradient-index optical element is of one or integer multiple of a half-pitch length, wherein a radial gradient index profile of the first optical element is substantially non-parabolic for creating the aberration; and wherein the second gradient-index optical element is of one or odd-integer multiple of a quarter-pitch length, wherein a radial gradient index profile of the second optical element is substantially parabolic for creating the desired mixture of the variable divergence of the laser beam exiting the exit lens and the variable diameter of the first laser beam waist.

6. The optical device of claim 3, wherein the beam launcher comprises an entry lens for launching the laser beam impinging thereon into the first end of the optical waveguide, and a shifter for providing a variable lateral displacement between the laser beam and an optical axis of the entry lens.

7. The optical device of claim 6, wherein the entry and exit lenses are mechanically coupled to the first and second ends of the optical waveguide, respectively.

8. The optical device of claim 7, wherein the entry lens is offset laterally with respect to the core of the optical waveguide, for launching the laser beam into the core to produce skew rays in the core; or wherein the entry lens is a gradient-index lens or a piece of a gradient-index fiber, and an outer facet of the entry lens is tilted, for launching the laser beam into the core to produce skew rays in the core; or wherein the laser beam is launched into the entry lens with a tilt in addition to the variable lateral displacement, for launching the laser beam into the core to produce skew rays in the core.

9. The optical device of claim 7, wherein the entry and exit lenses are integral with the optical waveguide.

10. The optical device of claim 9, wherein the entry and exit lenses have a same focal length.

11. The optical device of claim 9, wherein the entry and exit lenses are selected from the group consisting of a gradient-index lens, a gradient-index waveguide piece, and an end cap having a curved outer optical surface.

12. The optical device of claim 9, further comprising first and second end caps fused to outer surfaces of the entry and exit lenses, respectively.

13. The optical device of claim 12, wherein outer optical surfaces of the first and second end caps are curved to facilitate focusing of the laser beam into the first end of the optical waveguide and collimation of the laser beam exiting the second end of the optical waveguide, respectively.

14. The optical device of claim 6, wherein the shifter comprises a laterally displaceable lens or optical wedge, disposed upstream of the entry lens, for laterally displacing the laser beam.

15. The optical device of claim 14, further comprising a flexure mount for displaceably mounting the laterally displaceable lens or optical wedge.

16. The optical device of claim 2, wherein the core has a non-circular cross-section for facilitating formation of a substantially uniform radial distribution of intensity of the laser beam at the second end of the optical waveguide, thereby facilitating uniform distribution of ray angles at the first laser beam waist.

17. The optical device of claim 16, wherein the non-circular cross-section is selected from the group consisting of a square, rectangular, triangular, hexagonal, octagonal, D-shaped, rippled, cusped, and a star shape.

18. The optical device of claim 2, wherein the cladding has a diameter of at least 250 micrometers.

19. The optical device of claim 18, wherein the cladding comprises a SiO$_2$ cladding.

20. The optical device of claim 19, wherein a length of the optical waveguide between the first and second ends thereof is at least 1 m.

21. The optical device of claim 3, wherein the exit lens is mechanically coupled to the optical waveguide.

22. The optical device of claim 21, wherein the exit lens is integral with the optical waveguide.

23. The optical device of claim 22, wherein the exit lens is selected from the group consisting of a gradient-index lens, a gradient-index waveguide piece, and an end cap having a curved outer optical surface.

24. The optical device of claim 1, wherein the exit lens is selected from the group consisting of a gradient-index lens and a gradient-index waveguide piece, wherein a length of the exit lens is not a quarter pitch or an odd multiple thereof, and wherein the exit lens has a refractive index profile such that, when used in a length of one-quarter pitch, would yield a focal length of no greater than 10 mm.

25. The optical device of claim 1, wherein the optical waveguide comprises a polarization-maintaining, polarizing, chiral, or spun waveguide for controlling polarization of the laser beam.

26. The optical device of claim 1, wherein the optical waveguide is selected from the group consisting of a double-clad waveguide, a multi-clad waveguide, a photonic-crystal waveguide, and a micro-structured waveguide.

27. The optical device of claim 1, further comprising a vibrating unit coupled to the optical waveguide, for vibrating the optical waveguide when the laser beam is launched therein, to reduce a beam speckle structure at the first laser beam waist.

28. The optical device of claim 27, wherein the vibrating unit is selected from the group consisting of an acoustic transducer, an ultrasonic transducer, and a mechanical vibrator.

29. A laser beam delivery system for delivery of a laser beam to a target at a variable beam parameter product, the laser beam delivery system comprising:
the optical device of claim 1; and
a process head coupled to the optical device, the process head comprising a focusing element coupled to the exit lens, for imaging the first laser beam waist onto a second laser beam waist on or near the target.

30. The laser beam delivery system of claim 29, wherein an image magnification factor of the focusing element, defined as a ratio of diameters of the second and the first laser beam waists, is substantially independent of a variation of a divergence of the laser beam at a focal plane.

31. The laser beam delivery system of claim 29, further comprising
a camera for imaging the second laser beam waist; and
a controller coupled to the camera and to the beam launcher, for determining a diameter of the second laser beam waist imaged by the camera, wherein the controller is configured for causing the beam launcher to adjust the convergence angle or the launch angle of the laser beam, to reach a pre-determined value of the diameter of the second laser beam waist on the target.

32. The laser beam delivery system of claim 29, further comprising a shutter box for providing a controllable interruption of the laser beam delivered to the target, wherein the beam launcher of the optical device is disposed in the shutter box.

33. The laser beam delivery system of claim 29, further comprising an input fiber coupled to the input port of the optical device, for delivery of the laser beam emitted by a laser to the input port.

34. The laser beam delivery system of claim 29, further comprising a Raman filter for suppressing light produced by Raman scattering of the laser beam in the optical waveguide.

35. The optical device of claim 1, wherein the distribution of local ray angles proximate the second end of the optical waveguide includes a substantially preserved distribution of magnitudes of local rays with respect to the optical axis of the optical waveguide.

36. The optical device of claim 1, wherein in operation, the first laser beam waist is substantially rotationally symmetric due to a rotational symmetry of ray angles at the second end of the optical waveguide.

37. The optical device of claim 1, wherein the beam launcher is configured to make the launch angle larger than the convergence angle so as to create an annular spot downstream of the exit lens.

38. An optical device for varying a beam parameter product of a laser beam, the optical device comprising:
- an input port for inputting the laser beam into the optical device;
- an optical waveguide subassembly optically coupled to the input port, the optical waveguide subassembly comprising an optical waveguide having first and second ends and an exit lens coupled to the second end; and
- a divergence adjusting element coupled to the optical waveguide between the first and second ends thereof, for adjusting a divergence of the laser beam inside the optical waveguide, thereby varying a waist diameter or a divergence of the laser beam exiting the exit lens, thereby varying a beam parameter product of the laser beam exiting the exit lens.

39. The optical device of claim 38, wherein the divergence adjusting element comprises a mechanical presser unit mechanically coupled to the optical waveguide, for creating microbends in the optical waveguide, thereby increasing the divergence of the laser beam inside the optical waveguide.

40. The optical device of claim 38, wherein the optical waveguide comprises: first and second step-index waveguide sections coupled to the first and second ends, respectively, and a third graded-index waveguide section coupled between the first and second step-index waveguide sections;
- the divergence adjusting element comprising a heater or a mechanical stress unit for varying temperature or length, respectively, of the third graded index waveguide section, thereby varying the divergence of the laser beam inside the optical waveguide.

41. A method for varying a beam parameter product of a laser beam, the method comprising:
- providing an optical waveguide having first and second ends, a core, and a cladding surrounding the core, the core and the cladding extending between the first and second ends of the optical waveguide, and an exit lens coupled to the second end;
- launching the laser beam at a convergence angle or at a launch angle into the first end of the optical waveguide;
- propagating the launched laser beam in the optical waveguide from the first end to the second end, so as to enable ray angles of the laser beam guided by the optical waveguide to form a substantially rotationally symmetric distribution at the second end, while substantially preserving a distribution of magnitudes of local ray angles with respect to an optical axis of the optical waveguide;
- directing the laser beam through the exit lens, forming a first laser beam waist in the laser beam exiting the exit lens, wherein the first laser beam waist is substantially rotationally symmetric due to a rotational symmetry of the ray angles at the second end of the optical waveguide; and
- varying the convergence angle or the launch angle, to vary a beam parameter product of the laser beam exiting the exit lens.

42. The method of claim 41, wherein the launch angle is larger than the convergence angle, so as to create an annular spot downstream the exit lens.

* * * * *